L. PARODI.
HOISTING VESSEL FOR RAISING AND CARRYING SUBMERGED OBJECTS.
APPLICATION FILED AUG. 12, 1907.

916,006.

Patented Mar. 23, 1909.
2 SHEETS—SHEET 2.

Witnesses
W. H. Roberts
Anna M. Murray

Inventor
Luigi Parodi
By B. Singer
Attorney

UNITED STATES PATENT OFFICE.

LUIGI PARODI, OF GENOA, ITALY.

HOISTING VESSEL FOR RAISING AND CARRYING SUBMERGED OBJECTS.

No. 916,006.  Specification of Letters Patent.  Patented March 23, 1909.

Application filed August 12, 1907. Serial No. 388,205.

*To all whom it may concern:*

Be it known that I, LUIGI PARODI, subject of the King of Italy, residing at 7 Piazza Scuole Pie, Genoa, Italy, have invented certain new and useful Improvements in Hoisting Vessels for Raising and Carrying Submerged Objects, of which the following is a specification.

This invention relates to improvements in wrecking vessels designed for use in raising objects from the sea bottom and carrying them to shore.

The invention consists in the provision of a vessel of this character provided with a well adapted to receive the recovered object and provided with means for raising an object into said well.

A further feature of the invention consists in the provision of a float adapted to close communication between the well and the surrounding water after the object has been recovered and disposed in said well.

According to my invention the float is adapted to be maintained adjacent the vessel by means carried thereby and is controlled by valves to admit water to the float to cause the same to sink so that it may be brought into a position to close the well and means are provided for withdrawing water from the float after the same has been brought to a closing position so as to maintain the float in such position by its own buoyancy and to assist in maintaining the vessel and its load at a normal or navigable draw in the water.

The invention has other objects and novel features which will be more fully described in connection with the accompanying drawings and will be more particularly pointed out and ascertained in and by the appended claims.

Figure 1:
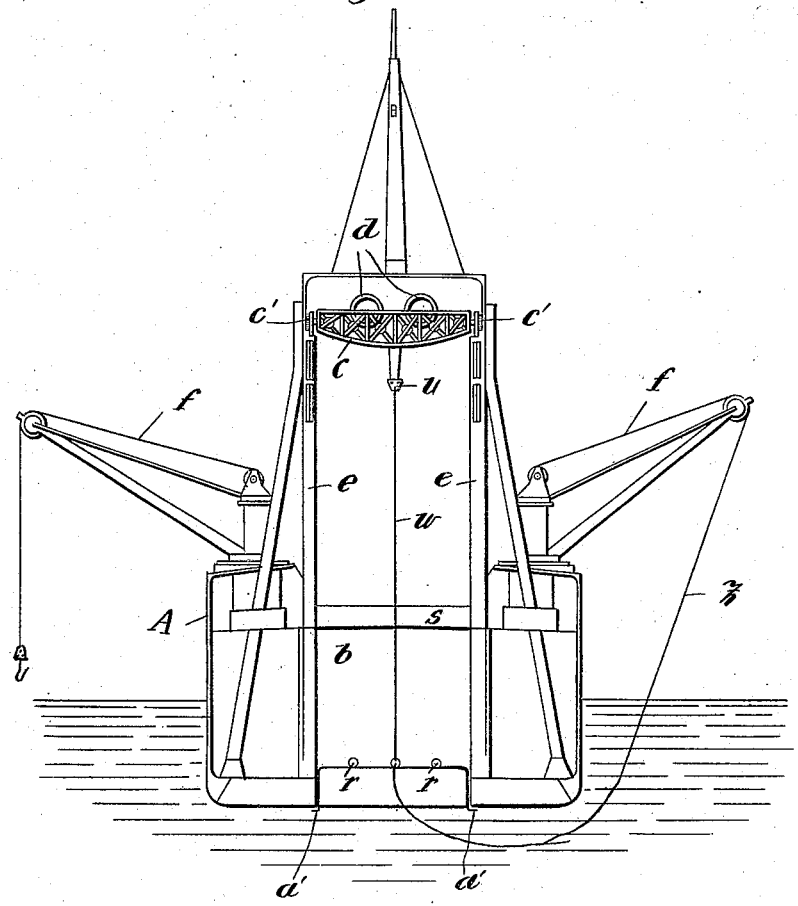
Figure 2:
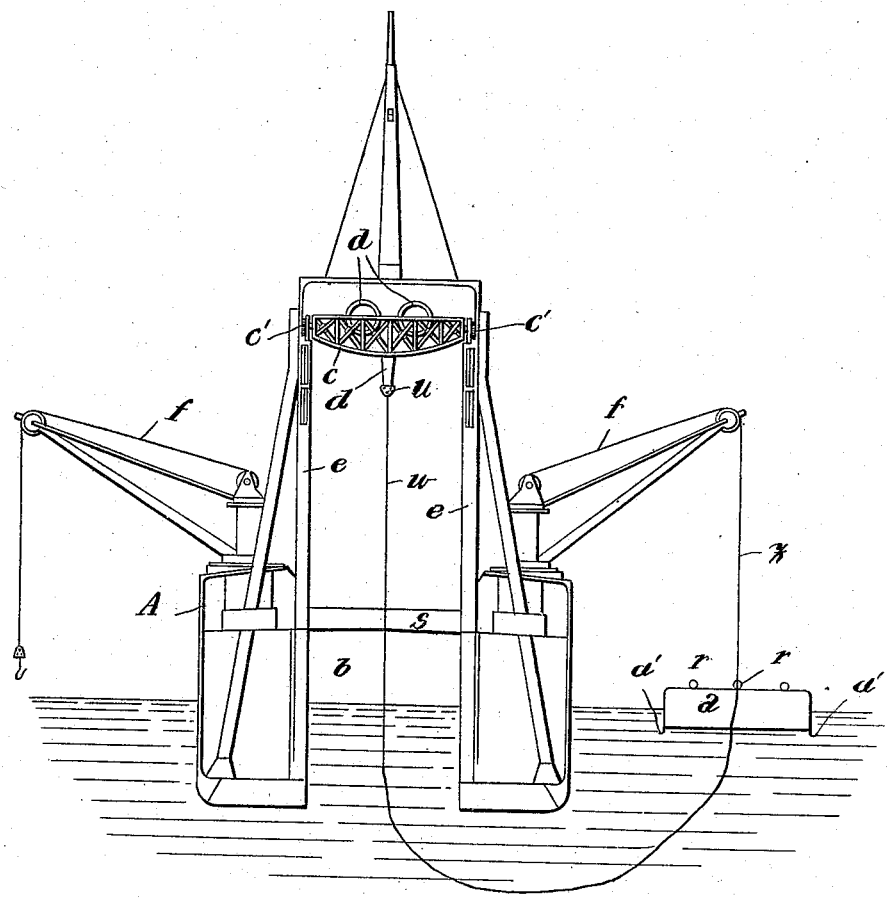

In the drawings:—Figure 1 is an end elevation of a wrecking vessel embodying the main features of my invention. Fig. 2 is a similar view showing parts in a changed position.

Like letters of reference designate similar parts throughout the different figures of the drawings.

As shown the hull or body of the vessel A is centrally divided to form a receiving space or well $b$ which may extend substantially throughout the length of the vessel. Said well may be closed at its sides and ends and is open at its bottom so as to admit objects into its interior. Said well is also open at its top so as to permit of the passage and manipulation of the crane cable or rope $w$. Standards $e$ support a traveling crane $c$ which is adapted to be moved longitudinally of the well $b$ on wheels $c'$. Said crane $c$ is provided with the usual drums $d$, which may be operated in any convenient or well known manner, and about which cables $d'$ are trained. An attachment or hook $u$ is secured to said cables $d'$ and also to the cable $w$ so that when the drums are operated the said cable $w$ may be raised or lowered as required. Said cable $w$ may be directly attached to the object to be raised or a separate cable may be attached to the hook $u$ as occasionally requires. Supporting members $s$ span the well $b$ and afford means for supporting the object after it has been raised into position by the crane. I conveniently provide auxiliary cranes $f$ which as shown are located upon the vessel $a$ at points laterally of the well $b$.

After the object has been raised into the well $b$ and is secured in place to the supporting members $s$ it is desirable to withdraw the water in the well and also to close the latter so that the vessel may be more easily propelled and in order to also increase its buoyancy under the weight of the load. To this end a closure is provided to fit the open bottom portion of the well and as shown said closure is in the form of a float which is designated at $a$. Desirably said float is approximately equal in width and length to the open portion of the well $b$ and is designated to fit the same with a working clearance. Said float is provided with means, preferably in the form of flanges $a'$, which overlap the marginal portions of the well and prevent the float closure from passing into the same beyond a predetermined point and to further serve as an effective closure for the well. The float $a$ is shown in a closing position in Fig. 1 and if desired rings $r$ may be provided whereby the float $a$ may be secured by cables or the like to the supporting members $s$ to prevent said float from being displaced from position in cases where the sea is rough. Said float $a$ is secured to the crane cable $w$ and is adapted to be drawn into place thereby and I desirably also connect said float $a$ with one of the cranes $f$ by means of a cable $z$. Suitable means may be provided for admitting water to the float $a$ and withdrawing the same therefrom for the purpose hereinafter to be described and means may also be provided for withdrawing water from the well when the closure $a$ is in place.

Assuming that the parts are in the position shown in Fig. 1 and that the vessel lies above the object to be raised, water will be admitted to the float $a$ causing the same to sink. The cable $w$ will be paid out to accommodate such action of the float and the cable $z$ will be drawn in to draw the float to one side so that the full area of the open bottom will be accessible to the entering object. The object to be raised may be connected by a separate cable to the hook $u$ and raised into position in the well $b$ and suitably supported on the members $s$. It will next be necessary to not only close the bottom of the well and withdraw the water therein but also prevent admission of water so as to maintain the vessel in a navigable condition. The cable $z$ will now be paid out allowing the float $a$ to sink and when said float arrives at a point of immersion below the vessel the crane $c$, which has been relieved from supporting the object by the members $s$, will now be actuated to draw in the cable $w$ and draw the float upwardly in the position shown in Fig. 1. When the flanges $a'$ engage the bottom of the vessel arresting further upward movement of the float the water therein will be expelled by suitable means and the resultant buoyancy of the float will cause it to remain in the position shown in Fig. 1. Subsequently the float will be secured to the supporting members $s$ in order to insure its being held in place or in case it is desired to rely partially upon the float to support the object. It will be understood that the buoyancy of the float will assist materially in maintaining the vessel in a proper position but to more fully avoid an excessive draft it is desirable to pump the water out of the well which may be accomplished by any well known means.

I claim:—

1. An apparatus of the class described comprising in combination, a vessel provided with a centrally disposed well opening at its bottom portion into the water, supports bridging said well and adapted to sustain a recovered object therein, a traveling crane disposed above said well and provided with a hoisting cable projecting therethrough for raising an object thereinto, and a float closure for said well.

2. An apparatus of the class described comprising in combination, a vessel provided with a centrally disposed well opening at its bottom portion into the water, supports bridging said well and adapted to sustain a recovered object therein, a traveling crane disposed above said well and provided with a hoisting cable projecting therethrough for raising an object thereinto, a float closure connected with said crane, and means carried by said vessel for operating said float independently of said crane.

In testimony whereof I have affixed my signature in presence of two witnesses.

LUIGI PARODI.

Witnesses:
 ALESSANDRO ALBITER,
 BRAGLIA MARINI.